W. L. MAST.
HITCHING DEVICE FOR TRACTION ENGINES.
APPLICATION FILED DEC. 19, 1913.
1,130,311.
Patented Mar. 2, 1915.
2 SHEETS—SHEET 1.
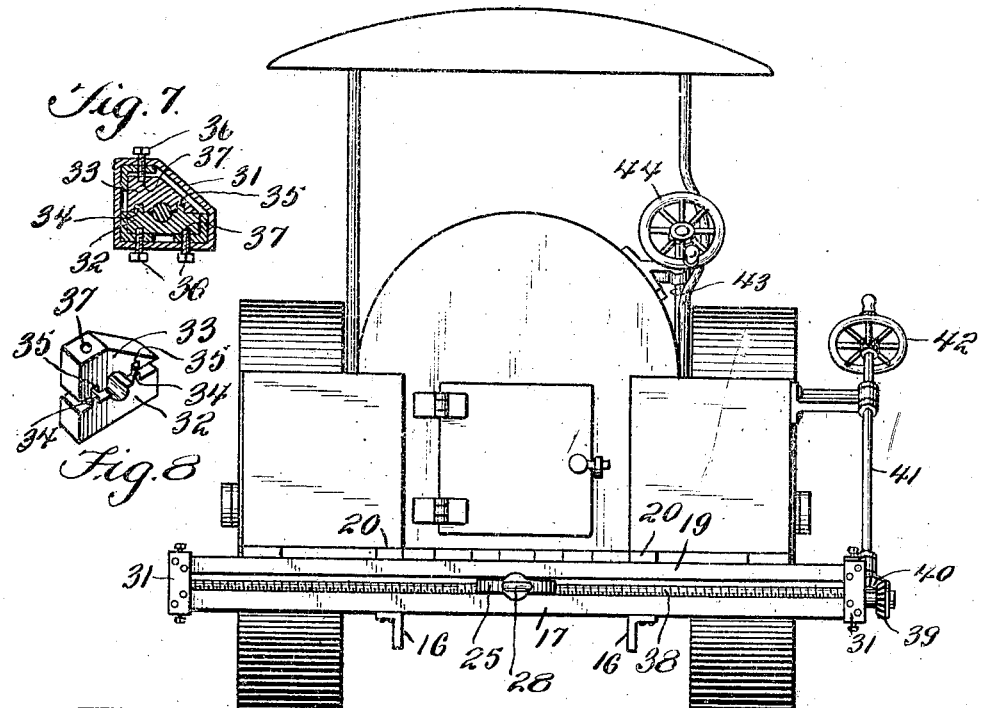
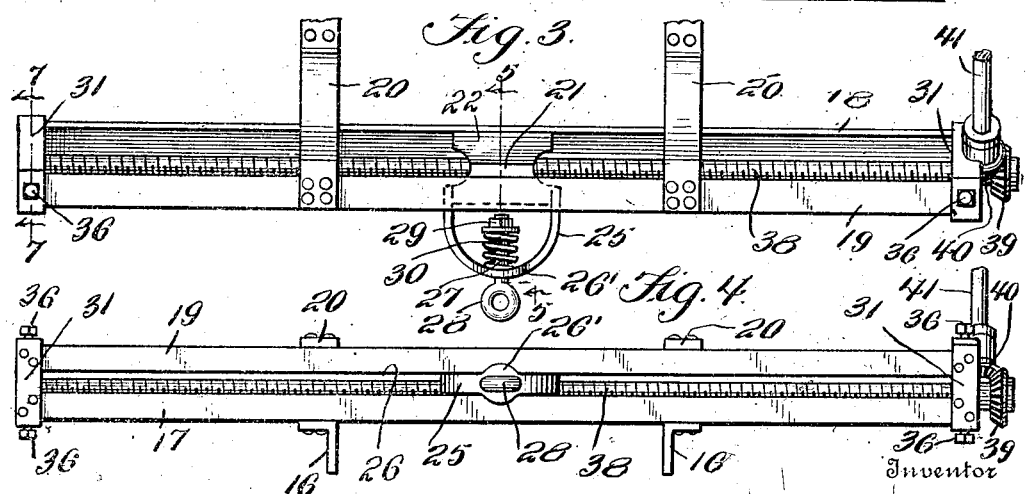
Witnesses
Inventor
William L. Mast
By Wm Bagger
Attorney W. L. MAST.
HITCHING DEVICE FOR TRACTION ENGINES.
APPLICATION FILED DEC. 19, 1913.
1,130,311.
Patented Mar. 2, 1915.
2 SHEETS—SHEET 2.
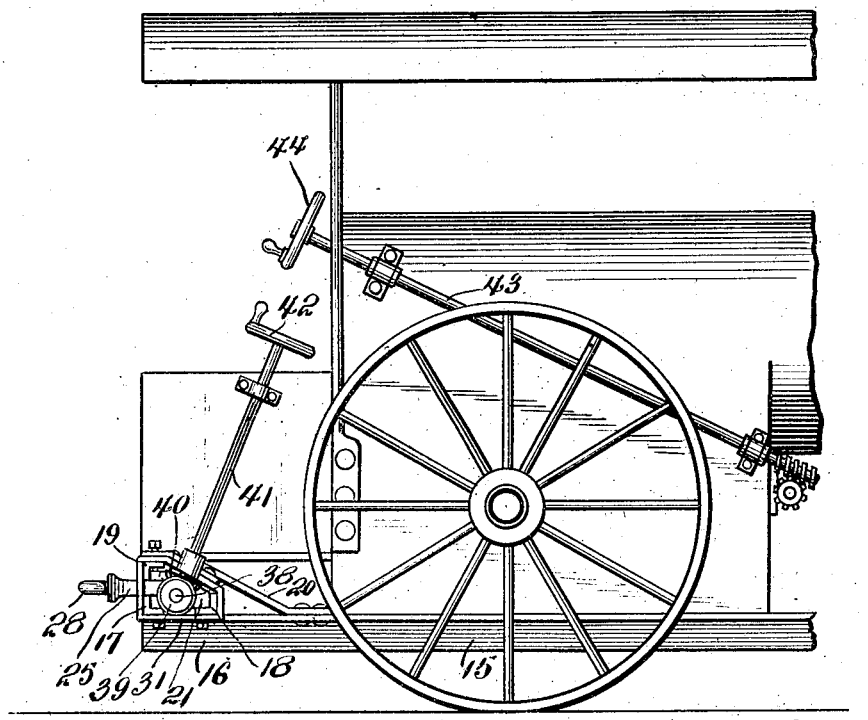
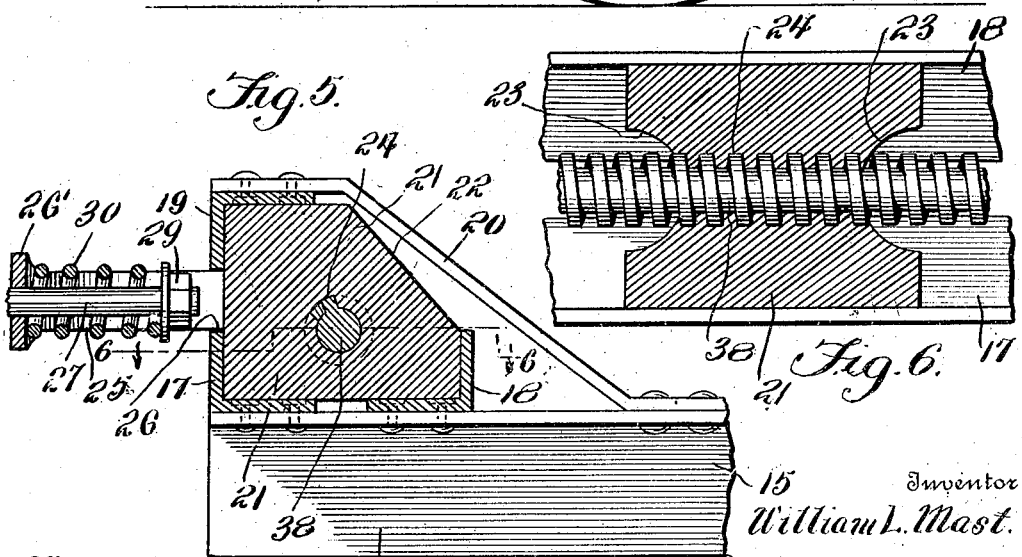
Inventor
William L. Mast.
Witnesses

UNITED STATES PATENT OFFICE.

WILLIAM L. MAST, OF ARTHUR, ILLINOIS.

HITCHING DEVICE FOR TRACTION-ENGINES.

1,130,311.  Specification of Letters Patent.  Patented Mar. 2, 1915.

Application filed December 19, 1913. Serial No. 807,696.

*To all whom it may concern:*

Be it known that I, WILLIAM L. MAST, a citizen of the United States, residing at Arthur, in the county of Douglas and State of Illinois, have invented certain new and useful Improvements in Hitching Devices for Traction-Engines, of which the following is a specification.

This invention relates to traction engines, and it has particular reference to an improved hitch for coupling a traction engine to a vehicle or implement such as a threshing machine, corn sheller or the like which is to be drawn thereby.

A special object of the invention is to provide a hitching device of simple and improved construction which may be shifted transversely with respect to the tractor, thus enabling the vehicle or implement that is to be moved to be placed some distance either to the right or to the left of the central medial line of the tractor and thus enabling such vehicle or implement to be drawn closer up to the side of a building than would otherwise be feasible.

A further object of the invention is to simplify and improve the construction and operation of the hitch, particularly with a view of producing a hitch casing which will be light and durable, as well as capable of resisting any strain to which it is liable to be subjected.

With these and other ends in view which will readily appear as the nature of the invention is better understood, the same consists in the improved construction and novel construction and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a rear elevation of a tractor that has been equipped with the improved hitching device. Fig. 2 is a side elevation of the rear portion of the tractor. Fig. 3 is a top plan view of the hitching device. Fig. 4 is a rear view of the same. Fig. 5 is a transverse sectional view, enlarged, taken on the line 5—5 in Fig. 3. Fig. 6 is a sectional detail view taken on the line 6—6 in Fig. 5. Fig. 7 is a sectional detail view taken on the line 7—7 in Fig. 3. Fig. 8 is a perspective detail view of one of the boxes constituting the bearings for the screw shaft.

Corresponding parts in the several figures are denoted by like characters of reference.

The frame of the tractor includes the sills 15 which are extended rearwardly to form arms or brackets 16 for the purpose of supporting the hitching device. The housing or casing of the hitching device is formed principally of three angle bars or L-shaped bars of steel or other material. Two of these bars 17 and 18 are supported on the brackets 16 in somewhat spaced relation, the upstanding flanges of said angle bars constituting, respectively, a portion of the rear wall and the front wall of the casing or housing. The third angle bar 19 is supported in an inverted position directly above the angle bar 17 by means of obliquely disposed arms or brackets 20, the lower ends of which are riveted or otherwise secured on the sills 15, while the horizontal flange of the angle bar 19 is riveted or otherwise secured on said brackets, the vertical flange of said angle bar constituting a portion of the rear wall of the housing. The housing, it will be seen, is thus formed of three angle bars arranged at three corners of a rectangle, the fourth corner being occupied by the obliquely disposed brace 20.

Fitted in the housing is a block or slide 21 having three rectangular corners fitted in the angles of the bars 17, 18 and 19, said slide having also an obliquely disposed side 22 to avoid interfering with the brace members 20. The end walls of the slide 21 are formed with arcuate recesses 23, and it has a transverse threaded bore 24 extending between said recesses. Secured upon and firmly connected with the slide 21 is a yoke 25 which extends rearwardly through the space 26 between the vertical flanges of the bars 17 and 19, said yoke having a swelled portion 26' which is apertured for the passage of a hitching bolt 27 having an eye 28 at the rear end thereof. Said bolt is also provided with a nut 29 between which and the yoke 25 is positioned a coiled spring 30 which surrounds the shank of the bolt.

The housing at the ends thereof is surrounded by hoops or bands 31, one at each end serving to reinforce the construction by preventing the angle bars 17, 18 and 19 from spreading apart at the ends. Mounted in the housing adjacent to each end thereof is a box or bearing member consisting of lower and upper parts 32, 33 having interengaging dowels and sockets 34, 35 in the meeting faces thereof and retained in position within the housing by fastening means, such as set screws 36, for the reception of the points of which the box members may be provided with recesses, as indicated at 37. By this construction, the parts of the device may be very readily assembled or taken apart when required for any purpose. The boxings afford bearings for the ends of the shaft 38 which is externally threaded for engagement with the threaded bore 24 of the slide 21, which latter by rotation of the shaft may be moved transversely toward either end of the housing.

The shaft 38 is extended at one end through its bearing, and it carries a bevel pinion 39 meshing with a bevel pinion 40 on a shaft 41, said shaft having at one end a crank 42 whereby it may be conveniently rotated for the purpose of rotating the screw whereby the slide 21 is moved in either direction.

The tractor has been shown as equipped with a shaft 43 which constitutes a steering shaft and which is equipped with the customary hand wheel or crank 44. The steering device is conventional and is no part of the present invention.

From the foregoing description taken in connection with the drawings hereto annexed, the operation and advantages of this invention will be readily understood.

The invention is simple in construction and is capable of being readily applied to almost any tractor of ordinary construction, it being understood that while the hitching device has been shown as being mounted on the rearwardly extended ends of the sills of the frame of the machine, and while this construction is preferable, any tractor frame may be equipped with brackets or supports whereon the hitching device may be mounted, the invention residing essentially in the improved construction of the housing and the assemblage of the parts. It is also desired to point out the special construction of the slide 21 herein shown as peculiarly advantageous; said slide should be of liberal length in order that the strain may be distributed upon the housing. In order to obtain the desired length of the slide without excessive weight, the concaved recesses 25 are provided, and the threaded bore which extends between said recesses is not of excessive length, thereby reducing friction between said bore and the screw when the device is operated. By the use of the improved hitch, a vehicle or implement may be moved by side draft from the tractor when desired; likewise, in case a vehicle or implement drawn by the tractor should skid or slew to either side, as is frequently the case on hillside roads and when the roads are slippery, such condition may be quickly corrected by moving the hitching slide in the opposite direction, thus permitting the vehicle or implement to be restored to the middle of the road gradually and without injury either to the road or to the vehicle.

A particular advantage derived from the construction of the improved housing as herein set forth, apart from the facility with which the parts of the device may be disassembled for repairs or other purposes by simply loosening the set screws 36 sufficiently to enable the bands 31 and the box members 32, 33 to be detached, is this that the space between the angle bars 17, 18 presents a slot or opening that will prevent the accumulation of dirt within the housing, thereby obstructing the operation of the slide 21, as would be the case if the housing were constructed with a solid bottom.

The general construction is simple and thoroughly efficient for the purposes for which it is provided.

Having thus described the invention, what is claimed as new, is:—

1. A tractor having rearwardly extending brackets, opposed rear and front angle bars mounted on said brackets and having upwardly extending flanges, an inverted angle bar supported above the rearward angle bar, obliquely disposed brackets supporting said inverted angle bar, a slide supported in the housing formed by the three angle bars and having a hitch yoke extending through the space between the vertical flanges of the rearward angle bar and the inverted angle bar, said slide having a threaded bore, a screw threaded shaft extending through said bore and supported for rotation adjacent to the ends of the housing, and means for rotating the shaft.

2. In a hitching device for traction engines, a housing comprising three angle bars supported in spaced relation at three corners of a rectangle, brackets supporting said angle bars, a slide mounted in the housing and having a transverse threaded bore, bearing members at the ends of the housing, each bearing member comprising separable box members, external hoops surrounding the housing at the ends thereof, fastening members extending through said hoops to secure the bearing members in position, a screw threaded shaft supported for rotation in the bearings and engaging the bore in the slide, and a hitching yoke securely connected with the slide and extending between the vertical flanges of two angle bars of the housing.

3. In a hitching device for traction engines, a housing supported on the tractor, said housing comprising three angle bars suitably supported and spaced apart, a slide supported on the housing, said slide consisting of a block having concave recesses at the ends thereof, and a threaded bore extending between said recesses, a hitching yoke connected with the slide and extending between the vertical flanges of two angle bars of the housing, a screw threaded shaft supported for rotation adjacent to the ends of the housing and extending through the threaded bore of the slide, and means for rotating the shaft.

In testimony whereof I affix my signature in presence of two witnesses.

WILLIAM L. MAST.

Witnesses:
ENOS W. BLUCKER,
M. N. SLABAUGH.